United States Patent [19]
Fleischer et al.

[11] Patent Number: 5,490,963
[45] Date of Patent: Feb. 13, 1996

[54] PREPARATION OF THIN FREE-STANDING DIAMOND FILMS

[75] Inventors: James F. Fleischer; Steven M. Gasworth, both of Scotia, N.Y.

[73] Assignee: General Electric Company, Worthington, Ohio

[21] Appl. No.: 369,047

[22] Filed: Jan. 5, 1995

Related U.S. Application Data

[62] Division of Ser. No. 73,239, Jun. 7, 1993, abandoned.

[51] Int. Cl.⁶ .................................................. H01L 21/302
[52] U.S. Cl. ............................................ 264/400; 264/162
[58] Field of Search .......................... 264/25, 1.21, 81, 264/162

[56] References Cited

U.S. PATENT DOCUMENTS

| | | | |
|---|---|---|---|
| 4,954,365 | 9/1990 | Nelfeld | 427/53.1 |
| 4,981,568 | 1/1991 | Taranko et al. | 204/192.31 |
| 5,006,203 | 4/1991 | Purdes | 156/646 |
| 5,112,458 | 5/1992 | Nakayama et al. | 204/173 |
| 5,221,501 | 6/1993 | Feldman et al. | 264/1.2 |
| 5,294,381 | 3/1994 | Iguchi et al. | 264/25 |

OTHER PUBLICATIONS

S. Jin et al., Massive thinning of diamond films by a diffusion process, Apr. 20, 1992.
S. Jin et al., Polishing of CVD diamond by diffusional reaction with manganese powder, 1992.
Masanori Yoshikawa, Application of CVD Diamond to Tools and Machine Components, 1991, pp. 1 and 23–29.

*Primary Examiner*—Christopher A. Fiorilla

[57] ABSTRACT

A process for shaping a thin, free-standing diamond film having a rough growth surface. The process includes the steps of: cutting the rough growth surface of said film with a laser to form a plurality of first ridges; translating said film in a direction parallel to said surface or rotating said film along an axis of rotation perpendicular to said surface; repeating said cutting to form a plurality of second ridges; and lapping said growth surface to reduce the height of said second ridges. The laser utilized may be a Nd:YAG laser and may be continuous or pulsed.

4 Claims, 1 Drawing Sheet

PREPARATION OF THIN FREE-STANDING DIAMOND FILMS

This is a divisional of application Ser. No. 08/073,239 filed on Jun. 7, 1993, abandoned.

The present invention relates to the preparation of thin free-standing diamond films of uniform thickness. More particularly, the invention relates to methods for the rapid removal of excess diamond film through the use of lasers. The obtained free-standing diamond films have a multitude of uses, including use as the dielectric in high energy density capacitors.

BACKGROUND OF THE INVENTION

The hardness and thermal properties of diamond are but two of the characteristics that make it useful in a variety of industrial components. Initially, natural diamond was used in a range of abrasive applications. With the ability to synthesize diamond by high pressure/high temperature (HP/HT) techniques utilizing a catalyst/sintering aid under conditions where diamond is the thermodynamically stable carbon phase, a variety of additional products found favor in the marketplace. Polycrystalline diamond compacts, often supported on a tungsten carbide base, further extended the diamond product line. However, the requirements of high pressure and high temperature have served as a limitation, e.g., in product configuration.

Recently, industrial effort directed toward the growth of diamond at low pressures, where it is metastable, has increased dramatically. Although the ability to produce diamond by low-pressure synthesis techniques has been known for decades, drawbacks including extremely low growth rates prevented wide commercial acceptance. Recent developments have led to higher growth rates, thus spurring further interest in the field. Additionally, the discovery of an entirely new class of solids, known as "diamond-like" carbons and hydrocarbons, is an outgrowth of such recent work.

Low pressure growth of diamond has been dubbed "chemical vapor deposition" or "CVD" in the field. One of the common techniques involves the use of a dilute mixture of hydrocarbon gas (typically methane) and hydrogen wherein the hydrocarbon content usually is varied from about 0.1% to 2.5% of the total volumetric flow. The gas is introduced into a reactor that contains a hot tungsten filament which is electrically heated to a temperature ranging from between about 1750° to 2400° C. The gas mixture dissociates at or near the filament surface and diamond forms on a hot substrate placed near the tungsten filament.

Whether natural or man-made, the same characteristics that make diamond so useful are occasionally also its greatest drawback. For example, the extreme hardness of diamond makes shaping or smoothing difficult. It would therefore be desirable to provide a method wherein diamond and diamond films may be shaped or smoothed more efficiently than the currently available procedures allow.

SUMMARY OF THE INVENTION

The unparalleled physical properties of diamond make it attractive for a broad range of applications. Moreover, the recently expanded utility of chemical vapor deposition (CVD) techniques for diamond film making has greatly increased the potential applications in areas requiring strength, scratch resistance, thermal conductivity, etc. However, the currently available techniques for smoothing and shaping diamond serve as a limiting factor to further expansion in uses for diamond and diamond films.

One potential application for diamond films not currently being exploited for this reason is as the dielectric in capacitors of high energy density. If stressed uniformly by an electric field equal to its reported breakdown strength of $10^7$ volts (10 MV)/cm, diamond would store 25 J/cm$^3$. To store 10 J/cm$^2$, a uniform stress of 63% of breakdown strength, 63 KV/100 μm, is required. Unfortunately, there are two physical features of "as-grown" free-standing diamond films that make even this reduced stress level difficult to realize at practical voltages, i.e., film thickness and film roughness.

With regard to film thickness, if films are grown thin enough (~100 μm) for practical operating voltages (~ 63 KV), they usually cannot be recovered as the broad, flat, free-standing films needed for multilayer capacitor structures. The films frequently detach from the substrate as small fragments due to the thermal expansion mismatch between diamond and substrate and the large temperature change the substrate undergoes as it cools to room temperature following the CVD process. Conversely, if the diamond films are grown thick enough (~300 μm) to allow large-scale recovery using conventional methods, impractically high operating voltages (~189 KV) would be required to realize an energy density of 10 J/cm$^3$.

Thin (~100 μm) diamond films may be grown and recovered by promoting a strong bond between the diamond and substrate during the period of cooling, and then dissolving the substrate. The problems with this approach include the tendency of the films to bow under internal stress once the restraining influence of the substrate is removed, and the cost and disposal issues raised by dissolution of the metal substrate.

On the other hand, if the film is grown thick enough (~300 μm) to allow direct recovery, one of the few currently available methods of reducing its thickness to the desired level is by mechanically lapping the film on a scaife, starting on the growth side (i.e., the side to which new carbon material attaches to existing film). Typically, this involves reducing an as-grown 300 μm thick film to a 100 μm thick plate with a smooth top surface. This approach is extremely time consuming. For example, with a standard lapping rate of 1 μm/hr, it takes approximately four work weeks to remove 200 μm, since the lapping wheel must be recharged with abrasive powder approximately every hour, and therefore cannot operate unattended overnight. This pace is entirely too slow.

In another currently used method, excess diamond is dissolved into certain metal foils, thereby avoiding lapping. Nevertheless, the dissolution rate is only 1– 2 μm per hour, again far too slow.

The second limiting physical characteristic of as-grown diamond films is their roughness. While the surface of the film against the substrate replicates the substrate finish, the growth surface is rough with peaks and valleys formed by the facets of adjacent crystallites. When the film is metallized the electrode on the growth side is left with pyramid-like projections into the film. In the vicinity of those projections the electric field is dramatically enhanced in comparison to its nominal value based on the applied voltage and the average film thickness, forcing a reduction in the breakdown voltage.

The present invention overcomes the foregoing problems by providing a method for rapid, efficient removal of most of the unwanted diamond film material to achieve any desired thickness. The process takes advantage of the fact that certain lasers have the ability to gasify diamond. By making laser cuts in a predetermined pattern, the excess portion of a thick diamond film may be rapidly removed. The lapping time required to produce the finished smooth film is thereby drastically reduced.

DETAILED DESCRIPTION OF THE PREFERRED EMBODIMENTS

The present invention provides a method for rapid wholesale removal of most of the unwanted diamond film material to achieve near-net thickness. The small balance of unwanted material would then be removed by conventional methods such as lapping. The method is based on the capacity of a number of lasers, pulsed or continuous, to locally gasify diamond. In the past, lasers have most often been applied to diamond films with the object of cutting through the film to achieve desired lateral dimensions. The laser is directed at normal incidence, and the focal point is gradually advanced into the film to maintain "coupling" to the receding film surface at the base of the cut.

Figure 1:
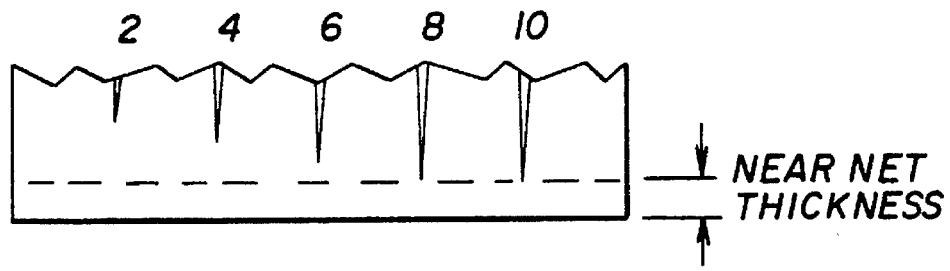
FIG. 1 is a cross-sectional view of an as-grown CVD diamond film cut with a fixed focal point, normally incident laser beam. The number of round-trip beam passes is indicated above each cut. Equal depth for 8 and 10 passes demonstrates controlled, self-limited depth of cut.

In contrast to the prior art, in the present invention a controlled and limited depth of cut is required. FIG. 1 demonstrates the results of a series of trials with our Nd:YAG laser directed at normal incidence on thick diamond films. We found that by adjusting such parameters as laser power, scanning rate, and the position of the focal point relative to the uncut diamond surface, the desired cut could be made with just a few passes of the laser. For example, by fixing the height of the focal point above the film, the laser and film will "decouple" after a few passes as the receding film surface moves out of range. Because additional passes then have no effect, a reproducible depth of cut is achieved. And since the "coupling" produces an audible sound, the laser operator knows in real time when a cut is completed.

Figure 2:
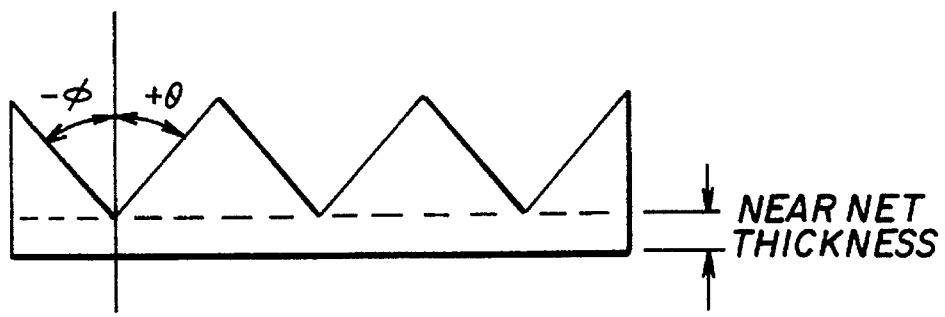
FIG. 2 is a cross-sectional view of a diamond film as cut pursuant to the method of the present invention. Cuts at +θ and −φ provide for rapid removal of excess diamond film. Additional 180° rotations and translations of the film allow for further reductions to the diamond layer thickness.

The exploitation of this discovery for the wholesale removal of diamond is illustrated in FIG. 2. A series of parallel cuts are made at an angle +θ to the film normal. The film is then reoriented to allow a second series of cuts at an angle −φ, as shown, to leave a series of ridges. If the film is now translated so that the laser is incident on the side of a ridge, the process can be repeated to remove additional material. Note that diamond need only be gasified along the cuts. Most of the removed material has simply been separated from the base film by these cuts.

In an alternative procedure the film is rotated any angle after the first set of ridges has been cut, and a similar series of cuts at +θ and −φ made. For example, if this rotation is 90°, the result is an array of pyramids with the same height as the ridges. Next, the film may be translated so that the laser is incident on the side of a pyramid. Further cuts and rotations reduce the height of the pyramids.

Figure 3:
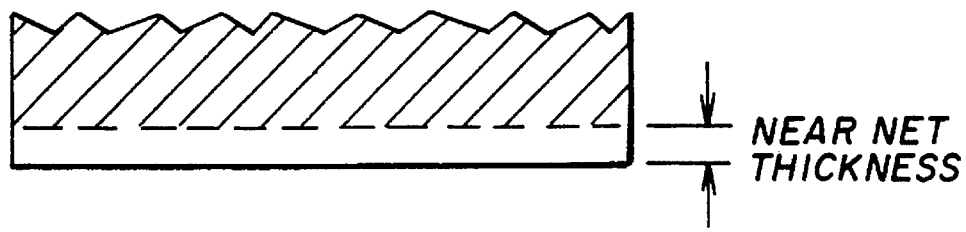
FIG. 3 is a cross-sectional view of a diamond film cut by an alternative method of the present invention. Numerous closely spaced cuts are made at +θ before a single 180° rotation is made for cuts at −φ.

The procedure illustrated in FIG. 2 is somewhat complicated by the need to have the cuts at +θ and −φ meet along the line marking the valley of a ridge. An alternative embodiment that makes this procedure less critical is illustrated in FIG. 3. The initial series of cuts at +θ is made with closer (cut to cut) spacing so that the corresponding series of cuts at −φ intersect them and form a cross-hatched pattern. The intersecting cuts provide for material removal and are easier to make than cuts which must terminate along a common line. Moreover, this alternative procedure requires that the film be reoriented only once.

Another procedure which avoids critical cuts combines one set of the linear laser cuts in FIG. 3 (e.g. at +θ) with curved cuts instead of the second set of linear cuts at −φ. The curved trajectories result from continuously rotating the film while the laser is cutting. By making the axis of rotation perpendicular to the plane of the film, and at an angle to the laser beam, the curved cut will be at an angle to the perpendicular of the film. With the laser stationary except for a periodic translation, a series of concentric circular cuts is made. With the laser translating during rotation, a helical cut is made. In either case, the combination of curved and linear cuts yields frequently intersecting cuts like those depicted in FIG. 3.

The foregoing examples were given by way of illustration of the invention and are not to be construed as a limitation thereof. Obviously, other modifications and variations of the present invention are possible in light of the above teachings. It is therefore to be understood that changes may be made in the particular embodiments of the invention described which are within the full intended scope of the invention defined by the appended claims.

We claim:

1. A process for shaping a thin, free-standing diamond film having a rough growth surface comprising the steps of:

(a) cutting the rough growth surface of said film with a series of first cuts of a laser at an angle +θ, said angle +θ being measured from the perpendicular to said surface;

(b) rotating said film 180° and cutting said growth surface with a series of second cuts at an angle −φ, said angle −φ being measured from the perpendicular to said surface whereby said second cuts intersect said first cuts to form a plurality of first ridges, said first ridges having a height;

(c) translating said film in a direction parallel to said surface or rotating said film along an axis of rotation perpendicular to said surface and repeating steps (a) and (b) to remove additional diamond with additional cuts such that a plurality of second ridges are formed, said second ridges having a height less than the height of said first ridges; and (d) lapping said growth surface to reduce the height of said second ridges.

2. A process according to claim 1 wherein said laser is a Nd:YAG laser.

3. A process according to claim 1 wherein said laser is pulsed.

4. A process according to claim 1 wherein said laser is continuous.

* * * * *